Patented June 24, 1930

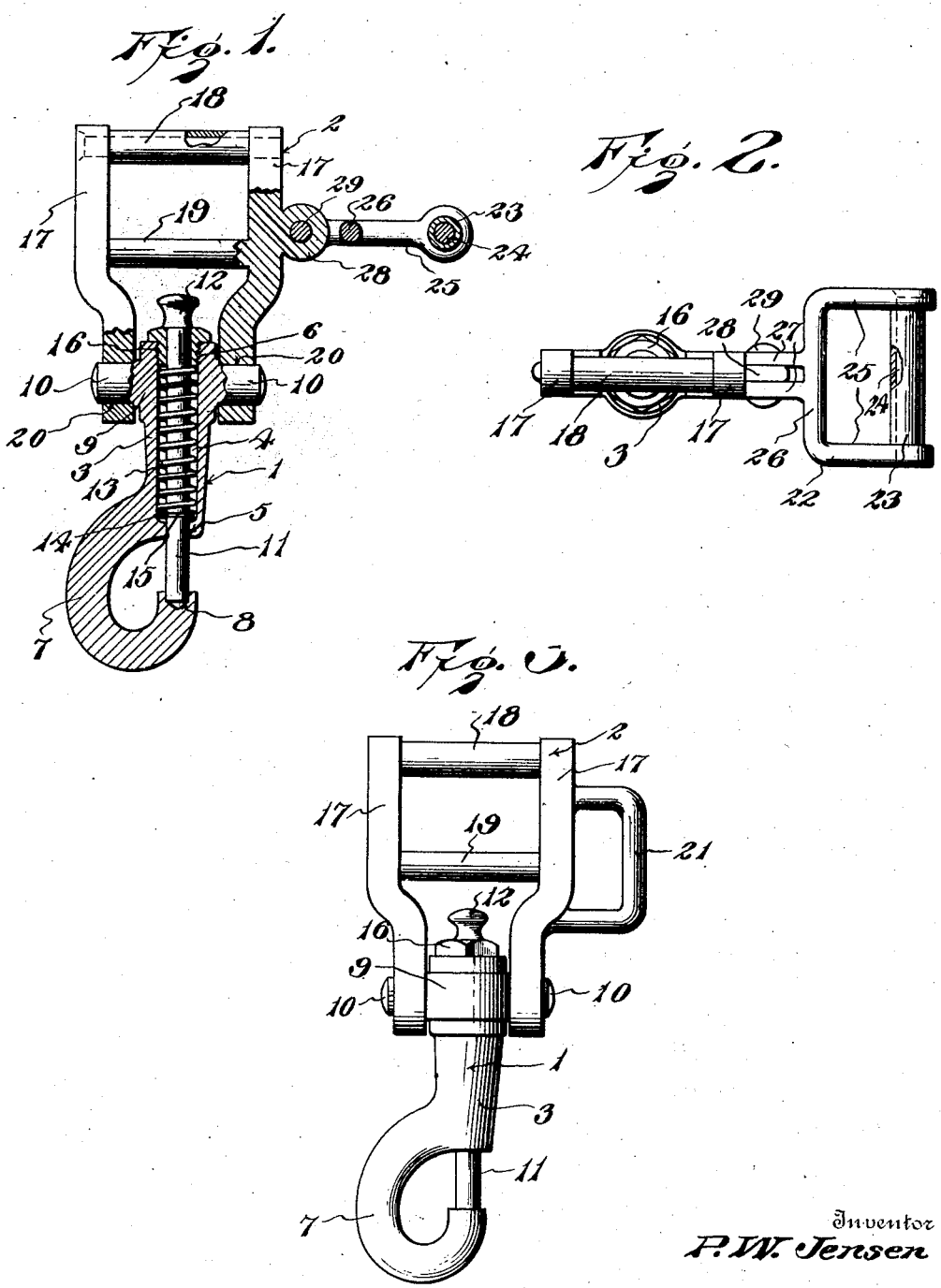

1,767,368

UNITED STATES PATENT OFFICE

PETER W. JENSEN, OF PRINCETON, MINNESOTA

SNAP HOOK

Application filed July 3, 1928. Serial No. 290,111.

This invention relates to snap hooks and constitutes an improvement upon the snap hook forming the subject-matter of my prior patent, No. 1,598,684, issued September 7, 1926.

One object of the invention is to provide a snap hook which may be employed for any purpose to which it is suited but is primarily intended for use in connection with harness and is adapted to be connected with straps constituting parts of the harness.

Another object of the invention is to provide the snap hook with an improved type of latch or keeper consisting of a pin slidable through the shank of the hook and yieldably held in a closed position by a spring bearing against an improved abutment carried by the stem.

Another object of the invention is to provide an improved type of shackle carried by the snap hook and pivotally connect the shackle with the shank of the hook in such a manner that the hook and shackle may have pivotal movement relative to each other but the shackle will be prevented from turning about the hook.

Another object of the invention is to provide a snap hook in which a shackle pivotally connected with the shank of the hook is provided with a side eye extending transversely from one side of the shackle.

The invention is illustrated in the accompanying drawing, wherein

Figure 1 is a view showing the improved snap hook principally in longitudinal section and partially in elevation;

Fig. 2 is a view showing the improved snap hook in end elevation and looking toward the shackle, and Fig. 3 is a side elevation of a slightly modified form of snap hook.

The improved snap hook consists of a hook which is indicated in general by the numeral 1 and a shackle pivotally carried thereby and indicated in general by the numeral 2. The shank 3 of the hook is formed with a longitudinally extending bore 4 having its forward end portion reduced, as shown at 5, and its rear end portion internally threaded, as shown at 6. The bill 7 which projects forwardly from the shank is formed integral therewith and terminates in spaced relation to the forward end of the shank and at its free end is formed with a recess or seat 8 disposed opposite the reduced forward end of the bore. Adjacent its rear end, the shank is externally thickened to form a collar 9 and pivots or trunnions 10 are formed integral with the collar and project from opposite sides thereof. It will thus be seen that the rear portion of the shank will be very strong and there will be no danger of the pivot pins or trunnions 10 becoming broken or working loose.

The latch pin or stem 11 which is slidably received in the bore 4 is of greater length than the shank and projects from opposite ends thereof with its forward end normally received in the seat or recess 8 of the bill. The rear end of the stem is enlarged to form a head 12 so that it may be easily grasped and drawn rearwardly against the action of the spring 13. This spring is coiled about the stem within the bore and at its forward end bears against an abutment consisting of a ring 14 firmly seated in an annular groove 15 formed in the stem within the bore. In the preferred construction, the ring is split so that it may be slid into place upon the stem and clamped tightly into its seat. The rear end of the spring bears against a retainer 16 which is screwed into the rear end portion of the shank and exerts pressure against the spring in order to place it under tension and cause it to yieldably retain the stem in the closed position, as shown in Fig. 1. It will be readily seen that, when it is desired to engage the hook with a trace chain or a ring or eye, it is merely necessary to grasp the stem by its head and draw it rearwardly so that the ring or a link of a chain may be engaged by the bill and the stem then released.

The shackle 2 is also formed of strong metal and consists of side arms 17 which are joined by cross bars or bridges 18 and 19. The bridge or cross bar 19 is formed integral with the side arms 17 and the upper bridge 18 preferably consists of a pin extending between and removably connected with the side arms and carrying a roller which is free to turn thereon. The forward end portions of the side arms are bent toward each other and then forwardly in parallel relation to each other and when so bent the trunnions or pivot pins 10 of the shank 3 of the hook will be disposed through openings 20 formed in the side arms and pivotally connect the shackle with the hook. Since the trunnions are rigid with the hook, the shackle will only be permitted to have pivotal movement longitudinally of the hook and will be prevented from having rotary motion about the hook. A side eye is carried by one of the arms of the shackle and may consist of an eye 21 extending longitudinally of the shackle and formed integral therewith, as shown in Fig. 3, or it may be pivotally connected with the shackle, as shown in Figs. 1 and 2.

In Figs. 1 and 2, the side eye which is indicated by the numeral 22 carries a roller 23 upon a pin 24 extending between its side arms 25 and its side arms are joined by a cross bar 26 from which extend ears 27. The ears 27 are disposed at opposite sides of an ear 28 which projects from one side arm of the shackle and a pivot pin or rivet 29 is passed through these ears to pivotally connect the side eye with the shackle. It will thus be seen that the side eye may have swinging movement longitudinally of the shackle but its movement will be in a plane at right angles to the plane in which the shackle moves relative to the hook.

The snap hook has many uses but the hook shown in Figs. 1 and 2 is primarily used in connection with a neck yoke strap and martingale and the hook illustrated by Fig. 3 is intended to be used at the end of a leather trace. When the neck yoke strap is secured about the roller of the bridge 18, the hook extends forwardly for engagement with an eye or ring at the end of a neck yoke and the martingale is engaged about the roller 23 of the side eye. The hook shown in Fig. 3 has the trace engaged about its bridge 18 and its bill engaged with a link at the end of a trace chain and is so disposed that its side eye extends upwardly for engagement by the side strap of a holdback. It will be understood that the hooks may be employed for other specific uses and used wherever convenient. It will also be understood that the shackles and side eyes may be modified in form and construction to accommodate them to different uses.

Having thus described the invention, I claim:

1. A snap hook including a shank having a bill at one end and integral trunnions adjacent the opposite end, and a shackle comprising side arms formed with openings in which the said trunnions are journaled, and a cross bar connecting the side arms intermediate their ends and forming a part thereof.

2. A snap hook including a shank having a bill at one end and having its opposite end portion enlarged annularly and provided with integral trunnions projecting from the said annular enlargement, and a shackle comprising side arms formed with openings in which the said trunnions are journaled, and a cross bar connecting the side arms intermediate their ends and forming a part thereof.

3. A snap hook including a shank having a bill at one end and integral trunnions adjacent the opposite end, and a shackle comprising side arms formed with openings in which the said trunnions are journaled, an integral cross bar connecting the side arms intermediate their ends, a detachable cross bar connecting the outer ends of said side bars, and an integral projection extending outwardly from the side arm at a point intermediate the ends thereof.

In testimony whereof I affix my signature.

PETER W. JENSEN. [L. S.]